United States Patent
Medina Luna et al.

(10) Patent No.: US 9,598,022 B1
(45) Date of Patent: Mar. 21, 2017

(54) CUP HOLDER-COMPATIBLE CONSOLE TRAY

(71) Applicant: FORD GLOBAL TECHNOLOGIES, LLC, Dearborn, MI (US)

(72) Inventors: Maria Fernanda Medina Luna, Naucalpan (MX); Omar Mendoza Vera, Estado de Mexico (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/862,591

(22) Filed: Sep. 23, 2015

(51) Int. Cl.
  *B60R 7/04* (2006.01)
  *B60N 3/10* (2006.01)
  *B60N 3/00* (2006.01)

(52) U.S. Cl.
  CPC .............. *B60R 7/04* (2013.01); *B60N 3/002* (2013.01); *B60N 3/101* (2013.01)

(58) Field of Classification Search
  CPC ........... B60R 7/04; B60N 3/002; B60N 3/101
  USPC .............................................. 296/37.8, 24.34
  See application file for complete search history.

(56) References Cited

U.S. PATENT DOCUMENTS

| | | | |
|---|---|---|---|
| 5,601,268 A | 2/1997 | Dunchock | |
| 6,109,580 A | 8/2000 | Stern et al. | |
| 6,533,233 B2 | 3/2003 | Thomas | |
| 6,543,637 B1 | 4/2003 | Osborn | |
| 6,732,990 B2 | 5/2004 | Hudson | |
| 7,029,048 B1* | 4/2006 | Hicks | B60R 7/04 296/193.04 |
| 8,550,550 B2 | 10/2013 | Cassese et al. | |
| 8,714,613 B1 | 5/2014 | Gillis et al. | |
| 2008/0048466 A1* | 2/2008 | Singh | B60N 3/08 296/37.8 |
| 2012/0097724 A1 | 4/2012 | Standfest et al. | |

FOREIGN PATENT DOCUMENTS

JP   2002316572 A   10/2002

OTHER PUBLICATIONS

English machine translation of JP2002316572A.
"Auto Car Snack Food Drink Bottle Cup Rack Holder Mount Stand Storage Organizer", ebay, http://www.ebay.com, 4 pages, Jul. 8, 2015.

* cited by examiner

*Primary Examiner* — Joseph D Pape
(74) *Attorney, Agent, or Firm* — Vichit Chea; King & Schickli, PLLC

(57) ABSTRACT

A center console assembly is provided. That center console assembly includes a storage compartment and a cooperating cover as well as a cup holder outside of the storage compartment. In addition, the center console assembly includes a console tray including a first mounting element and a second mounting element. The first mounting element secures the console tray in a first position within the storage compartment while the second mounting element secures the console tray in a second position in the cup holder.

18 Claims, 6 Drawing Sheets

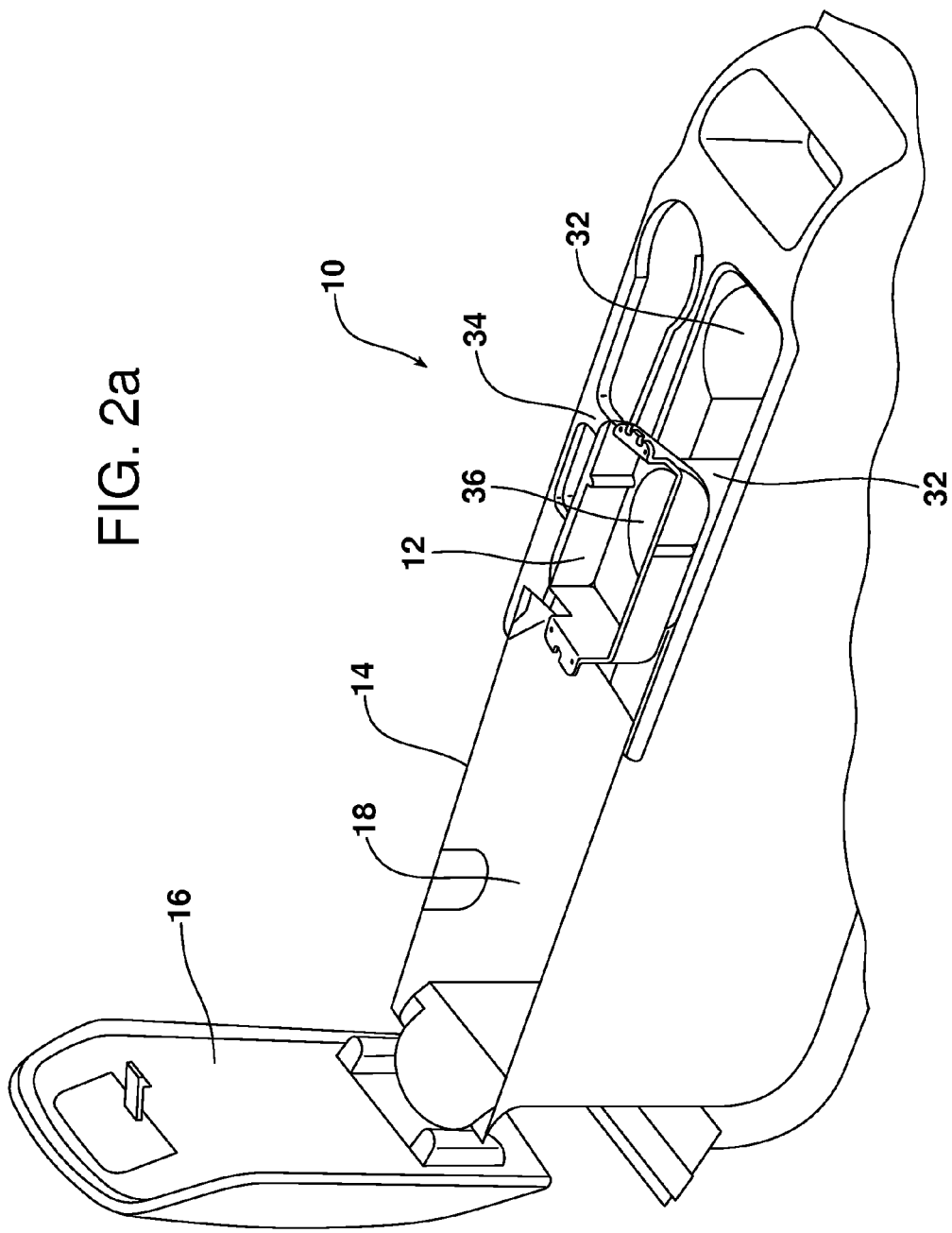

US 9,598,022 B1

CUP HOLDER-COMPATIBLE CONSOLE TRAY

TECHNICAL FIELD

This document relates generally to the motor vehicle equipment field and, more specifically, to a console tray that may be secured within a console bin or in a cup holder outside of the console bin as well as to a center console assembly incorporating such a console tray.

BACKGROUND

Vehicle operators and passengers have a nearly continuous need for storage space in a motor vehicle to hold various items such as cell phones, IDs, keys, business cards, writing pens, change for toll roads and the like. Many times, an operator or passenger will use a cup holder to hold these items.

While conveniently located, the available storage space is constrained by the size of a cup holder. Further, whenever the user needs to make use of the cup holder to hold a cup or water bottle, all items stored therein must be removed and relocated to another location such as the console bin or glovebox. This exercise can be a time consuming and frustrating endeavour when a number of items must be moved one or two at a time.

This document relates to a new and improved center console assembly and console tray that provides significant benefits and advantages to those seeking to store small items conveniently in a motor vehicle.

SUMMARY

In accordance with the purposes and benefits described herein, a new and improved center console assembly is provided. That center console assembly comprises a storage compartment and a cooperating cover as well as a cup holder outside the storage compartment. Further, the center console assembly includes a new and improved console tray that includes a storage receptacle, a first mounting element and a second mounting element. Advantageously, the first mounting element functions to secure the tray in a first position within the storage compartment of the console bin while the second mounting element functions to secure the console tray in a second position in the cup holder outside of the console bin.

In one possible embodiment, the first mounting element comprises a hanger. That hanger may include opposed mounting lugs.

In one possible embodiment, the second mounting element is a projection that is received in the cup holder. That projection may be cylindrical in shape so as to nest in the cup holder.

In accordance with an additional aspect, a method is provided for increasing the storage versatility of a console assembly of a motor vehicle. That method may be broadly described as comprising the steps of providing a console assembly with (a) a storage compartment and cooperating cover and (b) a cup holder outside of the storage compartment. The method also includes the step of providing a console tray having a first mounting element to secure the console tray within the storage compartment and a second mounting element to secure the console tray in the cup holder.

Still further, the method may include the step of incorporating a storage receptacle in the console tray. Further, the method may include the steps of hanging the console tray within the storage compartment or nesting the console tray in the cup holder.

In the following description, there are shown and described several preferred embodiments of the center console assembly and console tray. As it should be realized, the center console assembly and console tray are capable of other, different embodiments and their several details are capable of modification in various, obvious aspects all without departing from the center console assembly and console tray as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the center console assembly and console tray and together with the description serve to explain certain principles thereof. In the drawing figures:

FIG. 1b is a top plan view of the structure illustrated in FIG. 1a.

FIG. 2a is a perspective view of the center console assembly illustrating the console tray in a second position secured in one of the two cup holders of the center console assembly.

FIG. 2b is a top plan view of the structure illustrated in FIG. 2a.

FIG. 3b is a perspective view from below illustrating in detail the console tray shown in FIG. 3a.

Reference will now be made in detail to the present preferred embodiments of the center console assembly and console tray, examples of which are illustrated in the accompanying drawing figures.

DETAILED DESCRIPTION

Reference is now made to FIGS. 1a-3b illustrating the center console assembly 10 and console tray 12 that are the subject matter of this document.

Figure 1A:
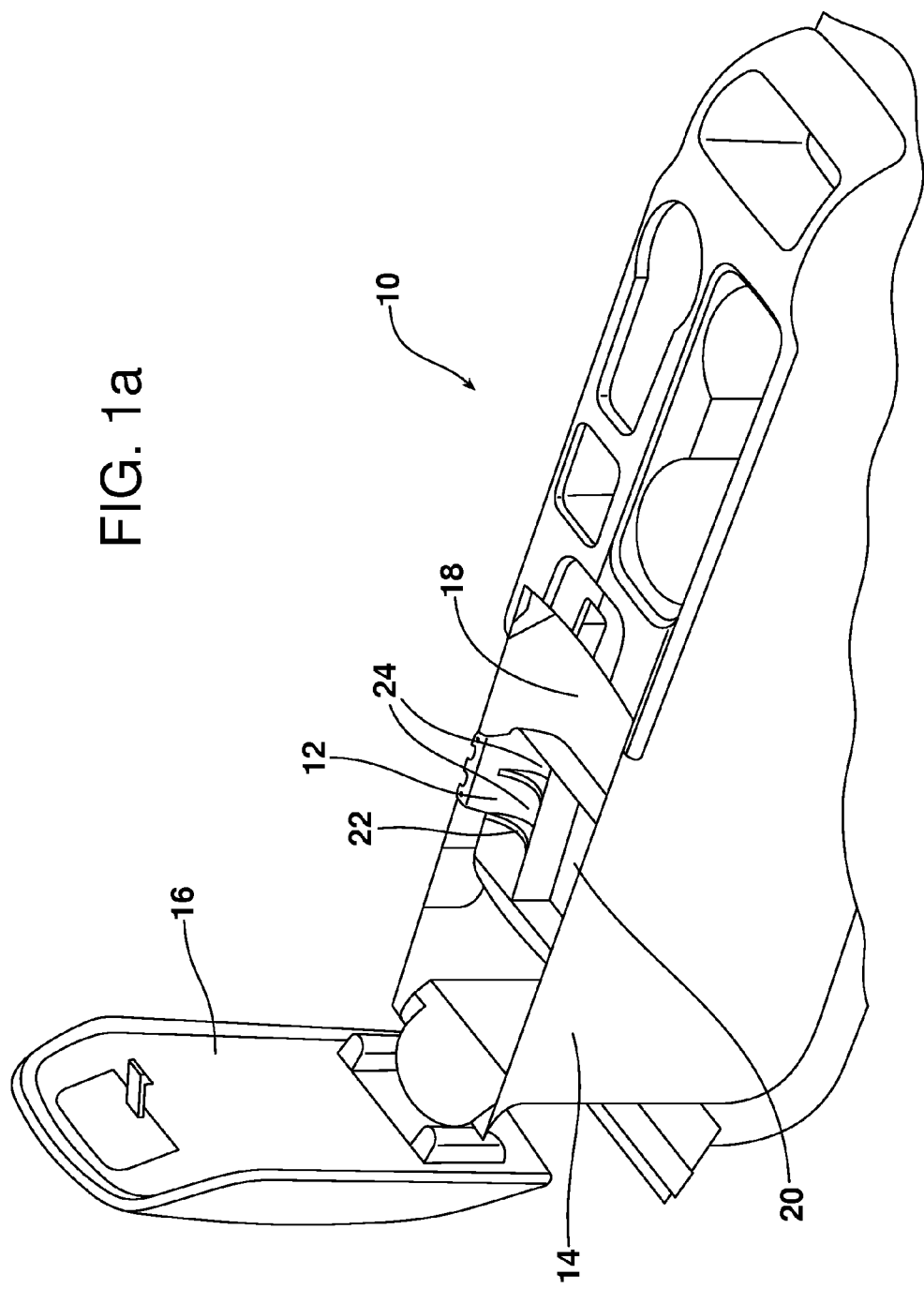
FIG. 1a is a perspective view of the center console assembly with the cover of the storage bin open to reveal the storage compartment and the console tray in a first position hanging in the storage compartment.
Figure 1B:
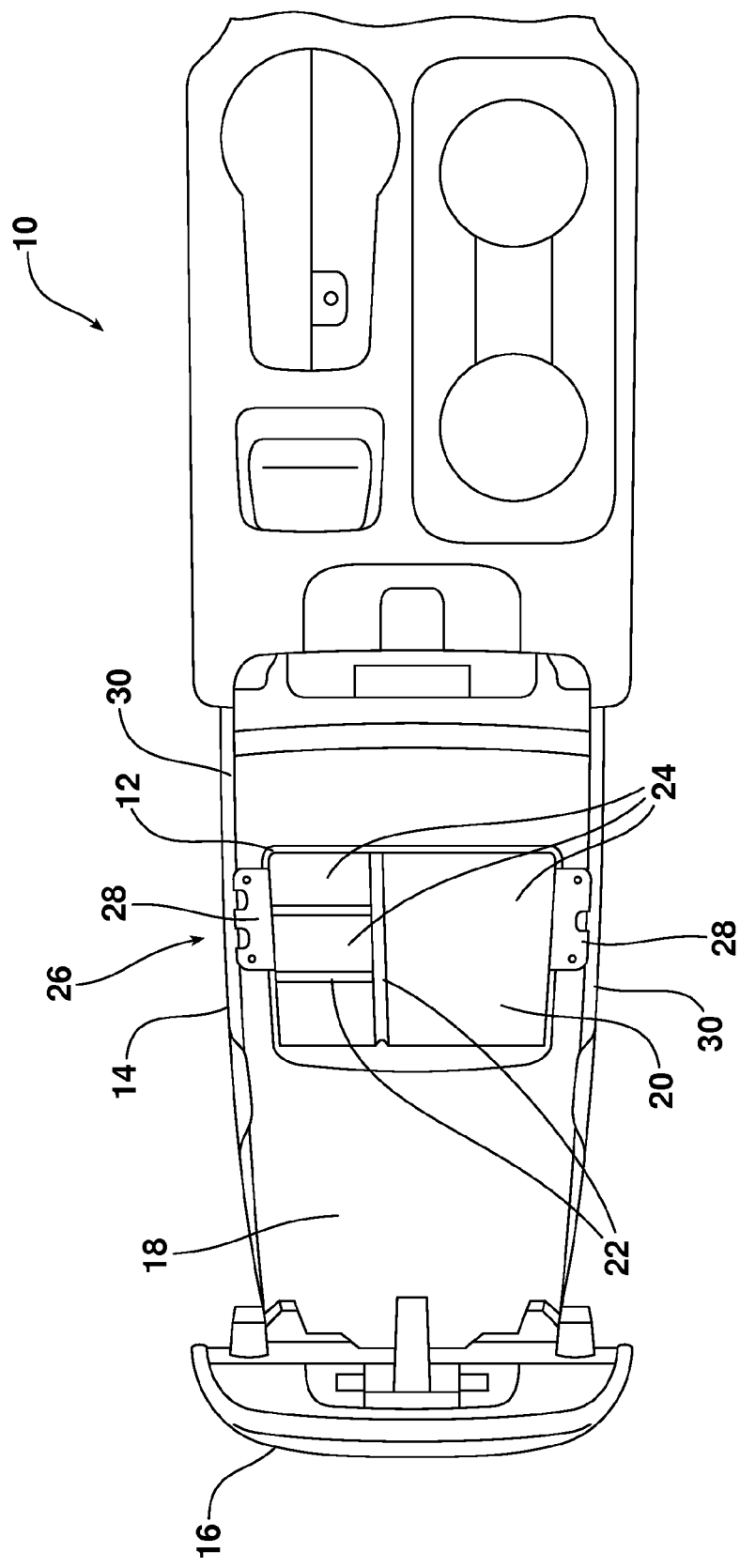

As illustrated in FIGS. 1a and 1b, the center console assembly 10 includes a storage bin 14 and a cooperating cover 16 defining a storage compartment 18. As illustrated in these figures, the console tray 12 may be mounted in a first position within the storage compartment 18 of the storage bin 14. As illustrated, the console tray 12 includes a storage receptacle 20 which may include dividers 22 defining multiple compartments 24 for receiving small items of various sizes such as coins, keys, lipstick tubes or the like.

The console tray 12 also includes a first mounting element, generally designated by reference numeral 26. In the illustrated embodiment, the first mounting element 26 comprises a hanger including two opposed mounting lugs 28 that project outwardly from the storage receptacle 20 so as to engage and rest on the opposed side walls 30 of the storage bin 14.

Figure 2B:
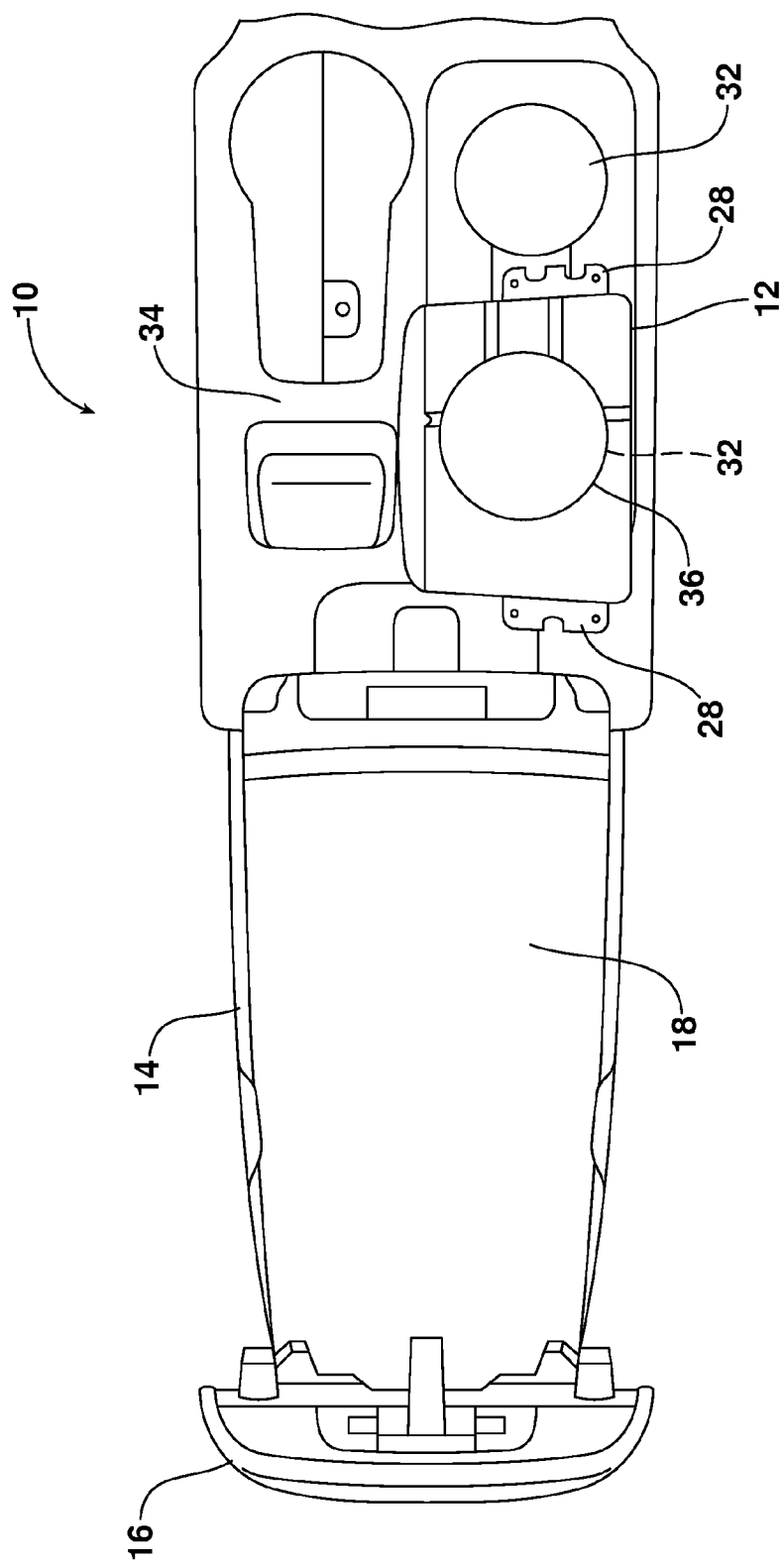
Figure 3A:
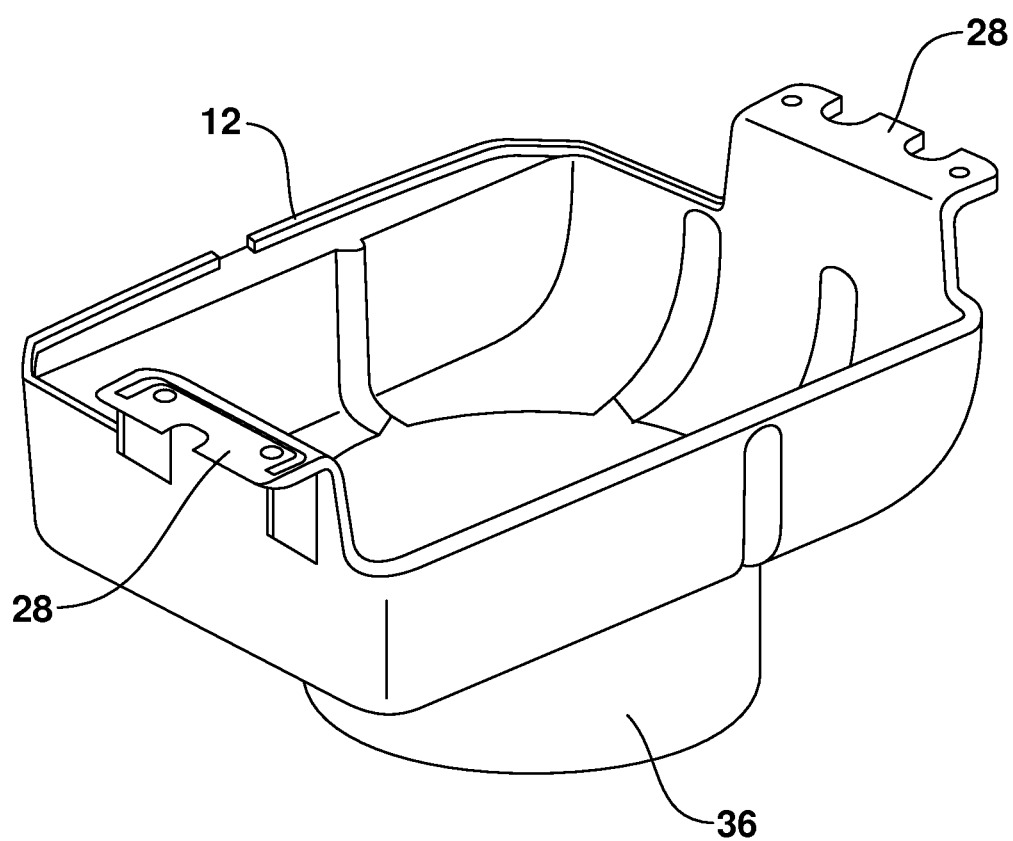
FIG. 3a is a perspective view from above illustrating in detail the console tray.
Figure 3B:
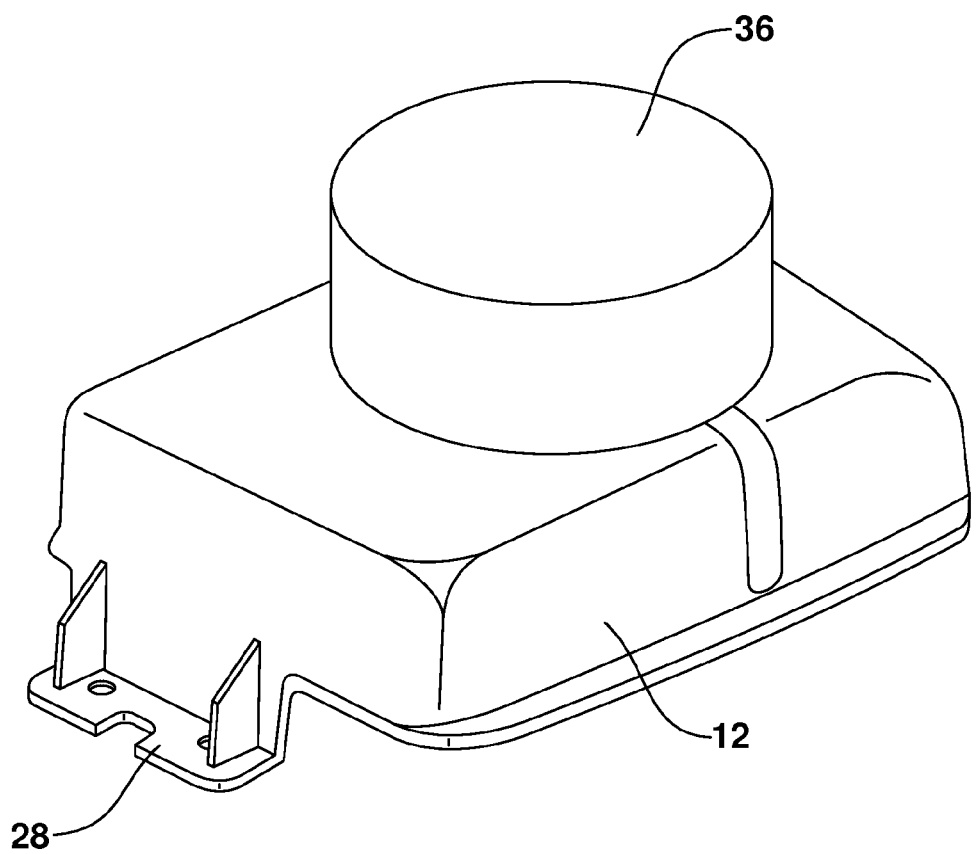

Reference is now made to FIGS. 2a and 2b which also illustrate the center console assembly 10. In these drawing figures, the console tray 12 is now secured in a second position within one of the two cup holders 32 provided in the facia 34 of the center console assembly 10 vehicle forward of the storage bin 14. As best illustrated in FIGS. 3a and 3b, the console tray 12 includes a second mounting element 36 for securing the console tray 12 in the second position in either of the cup holders 32. In the illustrated embodiment, that second mounting element 36 comprises a projection of cylindrical shape that positively engages and nests snugly in either cup holder 32. Here it should be noted that the storage receptacle 20 illustrated in FIGS. 1a and 1b has been removed to more clearly show the second mounting element 36 in FIGS. 2a-3b. Further, it should be noted that the console tray 12 may be mounted securely in either cup holder 32 depending upon the preference of the user.

It should be appreciated that the center console assembly 10 and the console tray 12 are particularly useful in a method for increasing the storage versatility of a console assembly of a motor vehicle. That method may be broadly described as incorporating the steps of providing a console assembly 10 with a storage bin 14 including a storage compartment 18 and a cooperating cover 16. The console assembly 10 also includes a cup holder 32 outside of the storage compartment. In addition, that method includes the step of providing a console tray 12 having a first mounting element 26 to secure the console tray within the storage compartment 18 and a second mounting element 36 to secure the console tray within a cup holder 32. Advantageously, it should be appreciated that these steps may be realized in such a way as to enable the cooperating cover 16 of the storage bin 14 to be fully closed over the storage compartment 18 while the console tray 12 is secured within the storage compartment 18. Thus, items stored in the tray 12 may be readily concealed from sight if desired.

In one possible embodiment, the method may also include the additional step of incorporating a storage receptacle 20 in the console tray 12. Further, in one possible embodiment, the method may also include the step of mounting the console tray 12 within the storage compartment 18 or nesting the console tray 12 in a cup holder 32.

In summary, numerous benefits are provided by the center console assembly 10 and console tray 12 described in this document. Advantageously, the console tray 12 may be securely positioned either within the storage compartment 18 of the storage bin 14 or outside of the storage bin 14 in a cup holder 32. Thus, a user may locate the storage receptacle 20 provided in the console tray 12 in one of multiple positions where it is most convenient or preferred by the user. As an added benefit, the storage receptacle 20 of the console tray 12 may hold multiple items, allowing them to be transferred simultaneously from, for example, a cup holder 32 to the storage compartment 18 and back again as desired. This is a significant benefit, as the user may need to utilize the cup holder 32 for holding a cup or water bottle, thereby requiring one to move the console tray 12 and the items contained therein from the cup holder 32 to the storage compartment 18 of the storage bin 14 in a quick and efficient manner.

The foregoing has been presented for purposes of illustration and description. It is not intended to be exhaustive or to limit the embodiments to the precise form disclosed. Obvious modifications and variations are possible in light of the above teachings. For example, in the illustrated embodiment, the tray 12 is secured in the cup holder 32 by means of the cylindrical projection 36. It should be appreciated that substantially any other appropriate structure could be used such as spatially oriented ribs. All such modifications and variations are within the scope of the appended claims when interpreted in accordance with the breadth to which they are fairly, legally and equitably entitled.

What is claimed:

1. A console tray, comprising:
a storage receptacle;
a first mounting element; and
a second mounting element;
wherein said first mounting element secures said tray in a first position within a console bin and said second mounting element secures said tray in a second position within a cup holder.

2. The console tray of claim 1, wherein said second position is outside of said console bin.

3. The console tray of claim 1, wherein said second mounting element is a projection received in said cup holder.

4. The console tray of claim 3, wherein said projection is cylindrical in shape and nests in said cup holder.

5. The console tray of claim 4, wherein said first mounting element comprises a hanger.

6. The console tray of claim 5, wherein said hanger comprises opposed mounting lugs.

7. The console tray of claim 1, wherein said first mounting element comprises a hanger.

8. The console tray of claim 7, wherein said hanger comprises opposed mounting lugs.

9. A center console assembly, comprising:
a storage compartment and a cooperating cover;
a cup holder outside of said storage compartment; and
a console tray including a first mounting element and a second mounting element;
wherein said first mounting element secures said console tray in a first position within said storage compartment and said second mounting element secures said console tray in a second position within said cup holder.

10. The center console assembly of claim 9, wherein said second mounting element is a projection received in said cup holder.

11. The center console assembly of claim 10, wherein said projection is cylindrical in shape and nests in said cup holder.

12. The center console assembly of claim 11, wherein said first mounting element comprises a hanger.

13. The center console assembly of claim 12, wherein said hanger comprises opposed mounting lugs.

14. The center console assembly of claim 9, wherein said first mounting element comprises a hanger.

15. The center console assembly of claim 14, wherein said hanger comprises opposed mounting lugs.

16. A method for increasing storage versatility of a console assembly of a motor vehicle, comprising:
providing a console assembly with (a) a storage compartment and a cooperating cover and (b) a cup holder outside of said storage compartment; and
providing a console tray having a first mounting element to secure said console tray within said storage compartment in a first position and a second mounting element to secure said console tray within said cup holder in a second position.

17. The method of claim 16, including incorporating a storage receptacle in said console tray.

18. The method of claim 17, including hanging said console tray within said storage compartment or nesting said console tray in said cup holder.

* * * * *